United States Patent [19]

McGovern

[11] Patent Number: 4,900,207

[45] Date of Patent: Feb. 13, 1990

[54] SELF-DRILLING FASTENER

[75] Inventor: Hubert T. McGovern, Westfield, Mass.

[73] Assignee: Arthur Jacobson, West Springfield, Mass.

[21] Appl. No.: 306,552

[22] Filed: Feb. 6, 1989

[51] Int. Cl.4 .................. F16B 25/00; F16B 35/02
[52] U.S. Cl. ................................. 411/383; 411/387
[58] Field of Search ............ 411/386, 387, 383, 403, 411/410

[56] References Cited

U.S. PATENT DOCUMENTS 2,993,950  7/1961  Forman ........................... 411/387
3,935,786  2/1976  Murray et al. ................... 411/29
4,022,099  5/1977  Ballantyne ....................... 411/383
4,762,453  8/1988  DeCaro ............................ 411/410
4,784,554 11/1988  Break .............................. 411/383

Primary Examiner—Neill R. Wilson
Attorney, Agent, or Firm—Chilton, Alix & Van Kirk

[57] ABSTRACT

A self-drilling fastener comprises a two-piece fastener assembly. The driver body of non-corrosive molded form includes a hex socket for torquing the fastener in position and a threaded shank. The shank receives a steel pointed member through a lower coupling socket. The pointed tip includes a threaded body portion. The fastener assembly is torqueable as a unit for installation.

3 Claims, 2 Drawing Sheets

SELF-DRILLING FASTENER

BACKGROUND OF THE INVENTION

This invention relates generally to fasteners which are employed for fastening components in a corrosive environment or any environment where a metallic fastener is not desired. More particularly, this invention relates generally to fasteners which are manufactured from non-corrosive materials.

A number of fasteners have been employed to fasten material to the deck of a roof or a metallic substrate. Fasteners which are at least in part manufactured from non-corrosive materials have been employed to meet the moisture conditions and environmental factors which adversely affect the useful life of fasteners. However, one of the drawbacks to the use of non-corrosive materials for the anchoring portion of the fastener assembly is that such materials are not sufficiently strong to allow the materials to be threaded or drilled into the many types of metal composites. Accordingly, most conventional assemblies employ a plastic head or retainer plate together with a metal fastener for securing the components together in corrosive environments.

SUMMARY OF THE INVENTION

Briefly stated, the invention in a preferred form is a self-drilling fastener for fastening components to metallic structures such as roof decks. The fastener includes a driver body having a head portion and an integral shank which axially projects from the head portion. The shank terminates at a distal end. The head portion comprises a radially extending retainer head which is preferably of rounded plate-like form. The head portion also includes a torque coupler which may be in the form of a hex-head socket for coupling an applied torque to the head portion. The shank includes a threaded portion which defines a socket opening through the distal end thereof. A self-drilling member for tapping into the metallic structure for threadable anchoring penetration thereof is constructed of a hardened metallic material such as steel. The self-drilling member comprises a tapered point and an axially extended threaded body having a diameter generally commensurate with the diameter of the shank of the driver body. The threaded body extends from the point to a proximal end. A lug axially projects from the proximal end. The lug is dimensioned for reception in the socket. The fastener body and the self-drilling member are rotatably drivable as a unit upon application of a torque to the metallic structure.

In a preferred embodiment, the fastener driver body has a molded construction and the retaining head has a generally rounded plate-like shape. The lug and the shank socket may have a substantially square section.

An object of the invention is to provide a new and improved self-drilling fastener assembly for securing a component to a steel or metallic structure.

Another object of the invention is to provide a new and improved self-drilling fastener assembly of efficient and low-cost construction which is capable of threadable penetration into a steel substrate and is also essentially non-corrosive at the exposed portions thereof.

A further object of the invention is to provide a new and improved self-drilling insulation fastener which may be installed in a very efficient manner.

Other objects and advantages of the invention will become apparent from the drawings and the specification.

DETAILED DESCRIPTION OF THE INVENTION

Figure 1:
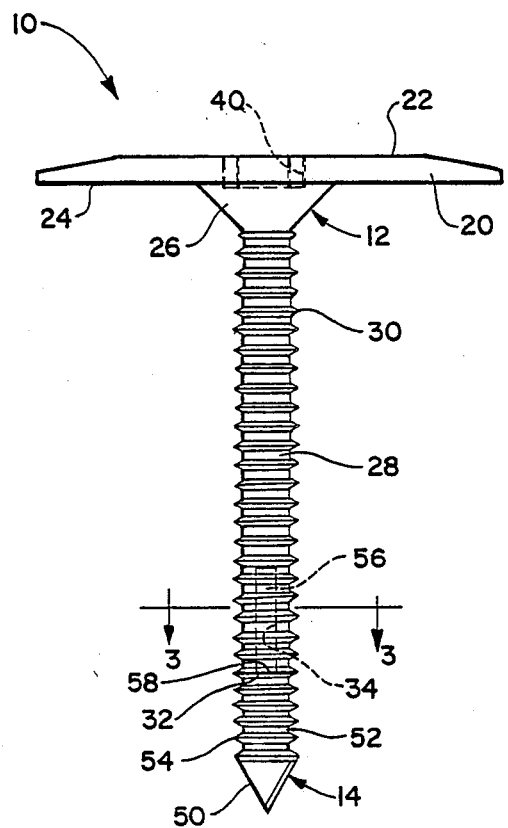
FIG. 1 is a side elevational view, partly in phantom, illustrating a self-drilling fastener in accordance with the present invention.
Figure 2:
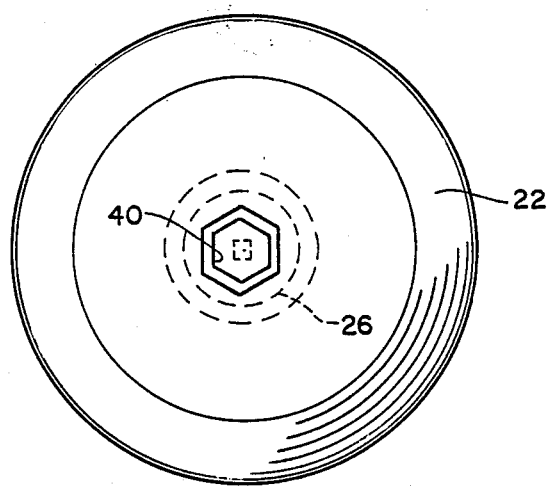
FIG. 2 is a top plan view, partly in phantom, of the fastener of FIG. 1.
Figure 3:
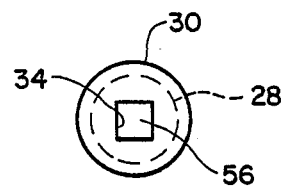
FIG. 3 is an enlarged sectional view of the self-drilling fastener taken along the line 3—3 of FIG. 1.

With reference to the drawings wherein like numerals represent like parts throughout the figures, a self-drilling fastener in accordance with the present invention is generally designated by the numeral 10. The fastener 10 is especially adapted for securing components to a steel substrate such as, for example, insulation to the deck of a roof. The fastener 10 is a two-element construction comprising a main body or driver 12 and a self-drilling piercing tip 14. The driver 12 is preferably constructed from a molded plastic material which may, for example, contain 50% glass/nylon composition. The piercing tip 14 is preferably constructed from steel.

The driver 12 is a one-piece element which comprises an upper generally circular rounded retainer plate 20 having an upper tapered surface 22 and a generally lower planar surface 24. Upon installation, surface 22 may be exposed to the environment or elements while surface 24 engages the top of the material which is fastened in place. A central tapered base 26 projects axially from the underside of surface 24 to provide a support for an axially extending shank 28. The shank 28 has a helical threading 30 which circumferentially extends from the upper portion of the shank to the lower distal end 32.

A central socket 34 extends axially from the distal end of the shank 28 to an intermediate portion thereof. The socket 34 has a substantially uniform square section. The socket 34 functions to receive and rotatably couple with the piercing tip 14 as will be more fully described below.

A hex head socket 40 is integrally formed in the upper central portion of the driver 12. The hex socket is coaxial with the shank 28. The socket 40 opens axially through the upper surface 22. The socket functions to receive a torque applicator head so that the torquing device such as a power torque gun or other suitable tool, may be inserted into the socket and rotatably driven to torque the driver and thereby the fastener to the roof deck or metallic substrate.

The piercing tip 14 includes a tapered point 50 and a threaded body 52. The body 52 ha a helical threading 54 at its peripheral end which is essentially dimensionally commensurate and mateable with the threading 30 of the shank. The diameter of the body 52 is substantially equivalent to the diameter of the shank 28.

An axially extending lug 56 projects from the upper proximal end surface 58 of the piercing tip so as to rotatably couple the piercing tip to the driver. The lug 56 has a cross-section which is commensurate with the cross-section of the slot and is closely receivable therein. In preferred form, the corresponding sections are substantially square in shape although other polygonal shapes are also suitable. It will be appreciated that when the lug is inserted into the shank and a torque is applied to the hex socket 40, the fastener assembly 10 will essentially be driven so as to rotate as a unit for threadable penetration into the metallic substrate. The upper portion of the fastener, e.g., the driver 12, which is exposed to the environment and the elements, will be essentially non-corrosive and less susceptible to moisture and the elements than ordinarily would be the case with metallic-type components. At the same time, the lower end of the fastener has a steel pointed portion which allows the fastener to be efficiently installed in self-drilling fashion into a steel or metallic substrate without exposing the steel or metallic portions of the fastener assembly to the elements or the environment.

While a preferred embodiment of the foregoing invention has been set forth for purposes of illustration, the foregoing invention should not be deemed a limitation of the invention herein. Accordingly, various modifications, adaptations and alternatives may occur to one skilled in the art without departing from the spirit and scope of the present invention.

What is claimed is:

1. A self-drilling fastener for fastening a material to a metallic structure comprising:

fastener body means having a one piece molded construction comprising a head portion and an integral shank axially projecting from said head portion and terminating at a distal end, said head portion comprising a radially extending retaining plate nd torque coupling means for rotatably coupling an applied torque to said head portion comprising an axially extending polygonally shaped first socket having a first maximum diameter, said shank comprising a threaded portion and defining a second socket opening through said distal end, said second socket having a maximum diameter substantially less than said first diameter; and self-drilling means for tapping into the metallic structure for threadable penetration thereof, said self-drilling means being constructed of a hardened metallic material and comprising a tapered point, an axially extending threaded body having a diameter generally commensurate with the diameter of said shank and extending from said point to a proximal end, and axially extending lug means integrally projecting from said proximal end for close reception in said second socket, so that said fastener body means and said self-drilling means are rotatably drivable as a unit upon application of a torque to said torque coupling means.

2. The self-drilling fastener of claim 1 wherein said fastener body means has a molded non-metal construction and said self-drilling means material is steel.

3. The self-drilling fastener of claim 1 wherein said lug means and said shank socket each have a substantially square section.

* * * * *